(12) United States Patent
Jakubowski

(10) Patent No.: US 8,193,764 B2
(45) Date of Patent: Jun. 5, 2012

(54) WIRELESS CHARGING OF ELECTRONIC DEVICES

(75) Inventor: Daniel Benjamin Jakubowski, Livonia, MI (US)

(73) Assignee: Jay Marketing Associates, Inc.

( * ) Notice: Subject to any disclaimer, the term of this patent is extended or adjusted under 35 U.S.C. 154(b) by 1026 days.

(21) Appl. No.: 11/835,820

(22) Filed: Aug. 8, 2007

(65) Prior Publication Data

US 2009/0039828 A1    Feb. 12, 2009

(51) Int. Cl.
*H02J 7/00* (2006.01)
(52) U.S. Cl. .......................................... 320/108
(58) Field of Classification Search .............. 320/106, 320/108
See application file for complete search history.

(56) References Cited

U.S. PATENT DOCUMENTS

| | | | |
|---|---|---|---|
| 5,734,254 A * | 3/1998 | Stephens | 320/106 |
| 5,952,814 A | 9/1999 | Lerberghe | |
| 6,184,651 B1 | 2/2001 | Fernandez et al. | |
| 6,844,702 B2 | 1/2005 | Giannopoulos et al. | |
| 6,906,495 B2 | 6/2005 | Cheng et al. | |
| 6,917,182 B2 | 7/2005 | Burton et al. | |
| 7,109,682 B2 * | 9/2006 | Takagi et al. | 320/108 |
| 7,151,357 B2 | 12/2006 | Xian et al. | |
| 7,180,265 B2 | 2/2007 | Naskali et al. | |
| 7,791,311 B2 * | 9/2010 | Sagoo | 320/108 |
| 2005/0134213 A1 * | 6/2005 | Takagi et al. | 320/108 |
| 2012/0013295 A1 * | 1/2012 | Yeh | 320/108 |

* cited by examiner

*Primary Examiner* — Richard V Muralidar
(74) *Attorney, Agent, or Firm* — Bruce M. Kanuch; Currie Kendall PLC

(57) ABSTRACT

Wireless chargers are provided. The wireless chargers can simultaneously receive and transmit power wirelessly. The wireless chargers can include a rechargeable battery so that the wireless charges can be used portably to charge electronic devices. The wireless chargers can also be programmable so that a user can select a power-transmitting protocol that is particularly suited for the electronic device being charged.

18 Claims, 5 Drawing Sheets

300

310
WIRELESSLY RECEIVE POWER AT A FIRST DEVICE LOCATED IN A HOUSING, THE FIRST DEVICE BEING A WIRELESS POWER-RECEIVING DEVICE

320
TRANSFER THE RECEIVED POWER TO A SECOND DEVICE LOCATED IN THE HOUSING, THE SECOND DEVICE BEING A WIRELESS POWER-TRANSMITTING DEVICE

330
WIRELESSLY TRANSMIT THE TRANSFERRED POWER FROM THE WIRELESS POWER-TRANSMITTING DEVICE

310
WIRELESSLY RECEIVE POWER AT A FIRST DEVICE LOCATED IN A HOUSING, THE FIRST DEVICE BEING A WIRELESS POWER-RECEIVING DEVICE

420
TRANSFER THE RECEIVED POWER TO A SECOND DEVICE LOCATED IN THE HOUSING, THE SECOND DEVICE BEING A WIRELESS POWER-TRANSMITTING DEVICE

422
TRANSFER RECEIVED POWER FROM THE WIRELESS POWER-RECEIVING DEVICE TO A RECHARGEABLE BATTERY LOCATED IN THE HOUSING

424
TRANSFER POWER FROM THE RECHARGEABLE BATTERY TO THE POWER-TRANSMITTING DEVICE

330
WIRELESSLY TRANSMIT THE TRANSFERRED POWER FROM THE WIRELESS POWER-TRANSMITTING DEVICE

532
WIRELESSLY RECEIVE AN IDENTIFICATION OF A POWER-TRANSMITTING PROTOCOL

534
OPERATE A WIRELESS POWER-TRANSMITTING DEVICE TO WIRELESSLY TRANSMIT POWER IN ACCORDANCE WITH THE RECEIVED POWER-TRANSMITTING PROTOCOL

540

542
RECEIVE IDENTIFICATIONS OF POWER-TRANSMITTING PROTOCOLS AT A WIRELESS COMMUNICATIONS DEVICE

544
ASSOCIATE EACH OF A PLURALITY OF SELECTABLE BUTTONS WITH AN IDENTIFIED POWER-TRANSMITTING PROTOCOL

546
DETECT THAT ONE OF THE PLURALITY OF SELECTABLE BUTTONS HAS BEEN SELECTED

548
OPERATE A WIRELESS POWER-TRANSMITTING DEVICE IN ACCORDANCE WITH A POWER-TRANSMITTING PROTOCOL ASSOCIATED WITH THE SELECTED BUTTON

WIRELESS CHARGING OF ELECTRONIC DEVICES

FIELD OF THE INVENTION

The present disclosure relates generally to wireless charging of electronic devices. More particularly, inventive matter disclosed herein provides for wireless chargers that are portable and wireless chargers that are programmable.

BACKGROUND

Wireless power transmission or wireless energy transfer is generally the process that takes place in any system where electrical energy is transmitted from a power source to an electrical load, without interconnecting wires. Devices that utilize wireless power transmission to charge or recharge a battery in an electronic device (e.g., cellular phone) are commonly referred to as wireless chargers or contact-less chargers.

Wireless chargers known in the art are typically placed on a surface such as the surface of a desktop or a countertop. An electronic device can then be placed on the wireless charger to charge the electronic device. Alternately, a wireless charger may be placed on the underside of a desktop or countertop. A user of the wireless charger can then place the electronic device to be charged on the desktop or countertop within range of the wireless charger. By within range it is herein meant that the electronic device to be charged is sufficiently close to the wireless charger such that the electronic device can receive power wirelessly transmitted from the wireless charger. In this manner, the user of the wireless charger does not see the wireless charger because the wireless charger is underneath the desktop or countertop. The user sees only the electronic device that the wireless charger is charging.

SUMMARY

Inventive matter discussed herein deviates with respect to and improves upon conventional technology such as discussed above and other technology also known in the prior art. A first example embodiment disclosed herein provides for wireless chargers containing both a wireless power-receiving device and a wireless power-transmitting device. The wireless chargers also include control logic that is capable of transferring power that is received by the wireless power-receiving device to the wireless power-transmitting device. Accordingly, wireless chargers disclosed herein can simultaneously receive and transmit power wirelessly. All the components of these wireless chargers are contained in a single housing so that the wireless chargers can be portable.

In particular embodiments wireless chargers disclosed herein are programmable. By programmable it is meant that the wireless chargers can operate so as to wirelessly transmit power in accordance with one of a plurality of selectable protocols. In this manner, a power-transmitting protocol may be selected that is particularly suited for the particular electronic device being charged by the wireless charger.

A second example embodiment disclosed herein provides for charging systems. The charging systems comprise a first wireless charger capable of wirelessly transmitting power and a second wireless charger, the second wireless charger being capable of receiving power transmitted by the first wireless charger. The second wireless charger is also capable of wirelessly transmitting power. For example, the second wireless charger can be the wireless charger of the first example embodiment described above.

A third example embodiment disclosed herein provides a method useful in wireless chargers and charging systems. The method comprises wirelessly receiving power at a first device located in a housing, the first device being a wireless power-receiving device. The method also comprises transferring the received power to a second device located in the housing, the second device being a wireless power-transmitting device. The method also comprises wirelessly transmitting the transferred power from the wireless power-transmitting device.

BRIEF DESCRIPTION OF THE DRAWINGS

Objects, features, and advantages of inventive matter disclosed herein may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 3 illustrates operations performable by a wireless charger in accordance with embodiments of inventive matter disclosed herein.

FIG. 4 illustrates operations performable by a portable wireless charger in accordance with embodiments of inventive matter disclosed herein.

FIG. 5 illustrates operations performable by a programmable wireless charger in accordance with embodiments of inventive matter disclosed herein.

DETAILED DESCRIPTION OF PREFERRED EMBODIMENTS

In accordance with particular embodiments of inventive matter disclosed herein, wireless chargers are provided. Generally, these wireless chargers comprise both a wireless power-receiving device and a wireless power-transmitting device. Having both a wireless power-receiving device and a wireless power-transmitting device allows the wireless chargers to receive power and transmit power simultaneously. The wireless chargers also comprise control logic that is capable of transferring power received by the wireless power-receiving device to the wireless power-transmitting device. The wireless chargers also comprise a housing that contains all the components of the wireless charger. The housing allows the wireless chargers to be portable. In particular embodiments, the wireless chargers may comprise additional components as described herein.

Figure 1:
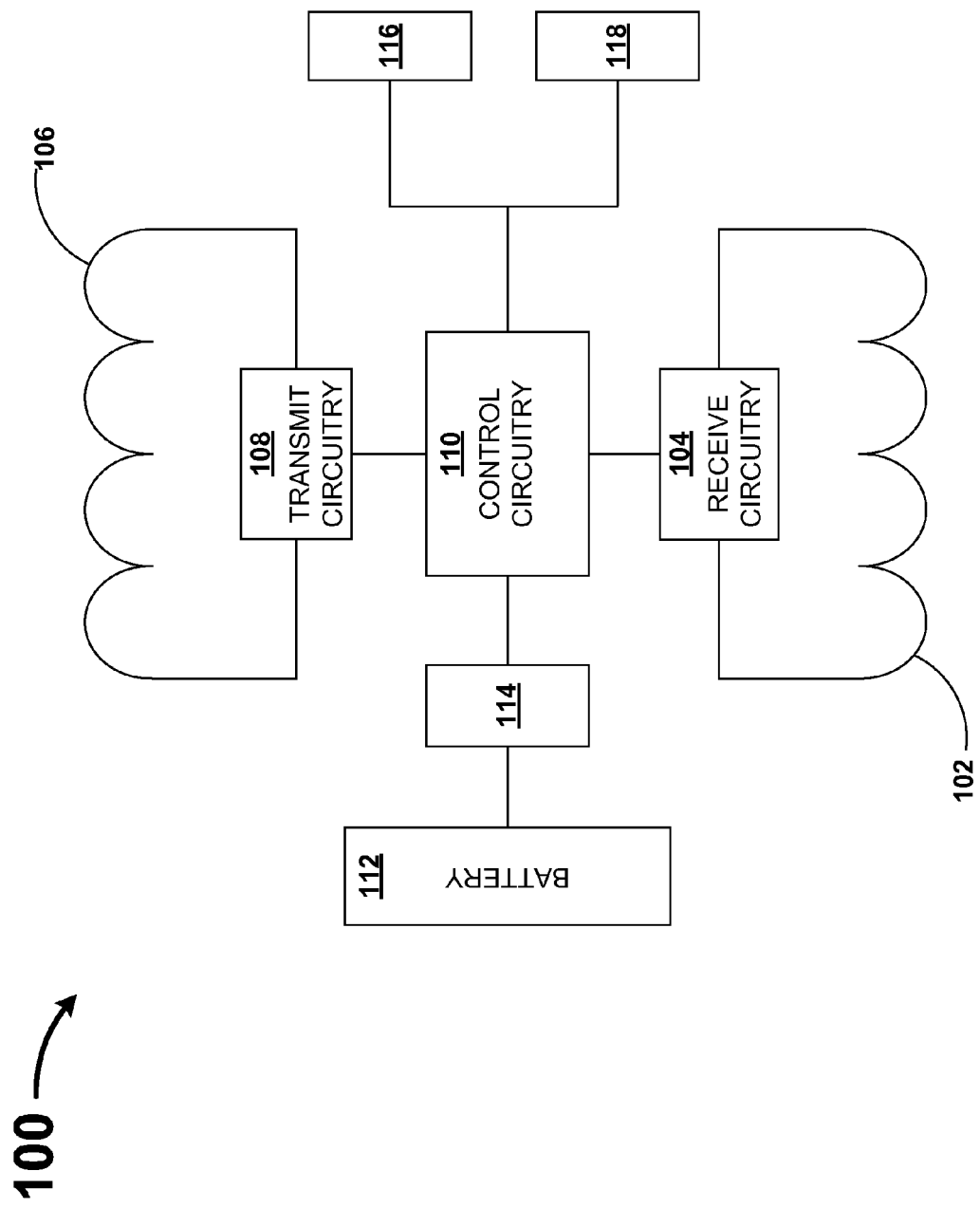
FIG. 1 shows a diagram of a wireless charger in accordance with embodiments of inventive matter disclosed herein.

FIG. 1 shows a diagram of an example wireless charger 100 in accordance with embodiments of inventive matter disclosed herein. The wireless power-receiving device of wireless charger 100 includes a receive coil 102 and receive circuitry 104. Wireless power-receiving devices useful in the wireless charger 100 may be manufactured and used in accordance with technology known in the art for producing wireless power-receiving devices. For example, the receive circuitry 104 may rectify an alternating voltage induced in the receive coil 102 to a direct current voltage.

Analogously, the wireless power-transmitting device of wireless charger 100 includes a transmit coil 106 and transmit circuitry 108. Wireless power-transmitting devices useful in the wireless charger 100 may be manufactured and used in accordance with technology known in the art for producing wireless power-transmitting devices. For example, the transmit circuitry 108 may produce an alternating voltage, having a predetermined frequency, from a direct current voltage supplied to the transmit circuitry during operation of the wireless charger 100 and supply the produced alternating voltage to the transmit coil 106. Also by way of example, the transmit circuitry 108 may produced a predetermined level of intensity of an inductive field in the transmit coil 106.

The control logic 110 of the wireless charger 100 controls the operation of the wireless charger 100 as described herein. The control logic 110 may comprise hardware alone (i.e., circuitry) or may include both hardware and software. The control logic 110 can be implemented by one of ordinary skill in the electronic arts without undue experimentation using technology that is known in the art. This technology may include, for example, application specific integrated circuits, a microprocessor executing code that is designed to implement the functions and methods described herein, programmable logic arrays, etc.

The control logic 110 is capable of transferring power received by the wireless power-receiving device to the wireless power-transmitting device. The control logic 110 may transfer the power directly from the wireless power-receiving device to the wireless power-transmitting device. For example, the control logic 110 may supply the transmit circuitry 108 with direct current voltage provided to the control logic 110 from the receive circuitry 104.

In particular embodiments, wireless chargers may additionally comprise a rechargeable battery. For example, the wireless charger 100 includes a rechargeable battery 112 and charge/discharge circuitry 114. The control logic 110 may transfer power received by the wireless power-receiving device to the rechargeable battery 112 instead of transferring the power directly to the wireless power-transmitting device. The charge/discharge circuitry 114 controls the charging and discharging of the rechargeable battery 112. For example, the control logic 110 may supply the charge/discharge circuitry 114 with direct current voltage provided to the control logic 110 from the receive circuitry 104. The charge/discharge circuitry can use the supplied direct current voltage to charge the rechargeable battery. When the rechargeable battery is charged, the control logic 110 can transfer power from the rechargeable battery 112 to the wireless power-transmitting device. For example, the control logic 110 may supply the transmit circuitry 108 with direct current voltage provided to the control logic 110 by the charge/discharge circuitry 114.

In particular embodiments, wireless chargers will have a display mechanism for providing a user with an indication of the operating status of the wireless charger. For example, the wireless charger 110 includes a display mechanism 116. The display mechanism 116 may include, for example, a charging indicator 216 (e.g., an LED) that indicates to a user that the wireless charger 110 is receiving power. The charging indicator 216 may light up, for example, when the wireless power-receiving device of the wireless charger 110 is receiving power. In particular embodiments, the charging indicator 216 may comprise a signal-strength meter, allowing the user to place the wireless charger 110 in a location where the signal transmitting the power is the strongest. The display mechanism 116 may include a battery-level indicator 214. In particular embodiments, a battery-level indicator 214 will light up when the rechargeable battery 112 is fully charged. In other embodiments, a battery-level indicator 214 will show approximately how much charge (e.g., expressed in approximate percentage) is in the rechargeable battery 112.

In particular embodiments, the control logic 110 is capable of operating the wireless power-transmitting device of the wireless charger 100 to wirelessly transmit power in accordance with a selectable power-transmitting protocol. These embodiments are referred to herein as programmable embodiments. In particular embodiments, the power-transmitting protocol is selected by a user of the wireless charger 100. In particular embodiments, the power-transmitting protocol may be selected by the electronic device to be charged.

In particular embodiments, a selectable power-transmitting protocol may include, for example, a particular frequency at which the transmit circuitry 108 produces an alternating voltage that the transmit circuitry 108 supplies to the transmit coil 106. Thus, selecting a first power-transmitting protocol may cause the transmit circuitry 108 to produce an alternating voltage at a particular frequency and selecting a second power-transmitting protocol may cause the transmit circuitry 108 to produce and alternating voltage at a different frequency. Analogously, a particular power-transmitting protocol may include, for example, a particular level of intensity of an inductive field for the transmitting coil 106. Thus, selecting a first power-transmitting protocol may cause the transmit circuitry 108 to produce a particular level of intensity of the inductive field, whereas selecting a second power-transmitting protocol may cause the transmit circuitry 108 to produce a different level of intensity for the inductive field.

In particular embodiments, the wireless chargers will have a settings mechanism, providing a user of the wireless charger with a means for selecting parameters for the operation of the wireless charger. The settings mechanism may comprise, for example, a plurality of selectable buttons with each selectable button having a power-transmitting protocol associated with it. A selectable button is something that a user can depress or touch to select the button. For example, a selectable button may be a mechanical button similar to the buttons found on most telephones. Thus, in particular embodiments, a user of the wireless charger may select a mechanical button by depressing the button. Also, a selectable button may be a touch-sensitive spot on a touch-sensitive screen. Touch-sensitive screens with touch-sensitive buttons are frequently used in implementing user interfaces to computers, telephones, personal digital assistants, etc. Thus, in particular embodiments, a user of the wireless charger may select a touch-sensitive button by touching the button.

The wireless charger 100 includes a settings mechanism 118. The settings mechanism 118 includes four selectable buttons (shown in FIG. 2). Each selectable button has associated with it a power-transmitting protocol. The control logic 110 is capable of detecting when one of the selectable buttons is selected. The control logic 110 is also capable of operating the wireless power-transmitting device in accordance with the power-transmitting protocol associated with the selected buttons. In this manner, a user of the wireless charger 100 can choose a particular power-transmitting protocol that is best suited for a particular electronic device to be charged. For example, the user may select button 1 to select a power-transmission protocol that is suited for charging a particular cellular phone. The user may select button 2 to select a power-transmission protocol that is suited for charging a different electronic device, such as a different cellular phone or a rechargeable computer mouse. Similarly, button 3 and button 4 may be used for charging other electronic devices.

In particular embodiments, the wireless charger 100 also comprises a wireless communications device (not shown) capable of receiving identifications of power-transmitting protocols. Wireless communications devices are well known in the electronic arts and implementing a wireless communications device suitable for use in embodiments of the wireless charger 100 can be accomplished by one of ordinary skill in the electronic arts without undue experimentation. By receiving an identification, it is meant that information is received that is sufficient to identify a particular power-transmitting protocol. In particular embodiments, the received information may be a single numeric value that the control logic 110 has associated with a particular power-transmitting protocol. In other embodiments, the received information may include values that correspond to parameters of a power-transmitting protocol, such as the frequency of alternating voltage and the intensity of the inductive field as discussed above.

The wireless charger 100 may receive an identification of a power-transmitting protocol from an electronic device to be charged. For example, an electronic device to be charged may be placed within range of the wireless charger 100. If the electronic device is capable of detecting that it is within range of the wireless charger 100 and is capable of wirelessly communication with the wireless charger 100, the electronic device to be charged may transmit an identification of a power-transmitting protocol for the wireless charger 100 to use when the wireless charger 100 charges the electronic device. The wireless charger 100 may receive the transmitted identification of a wireless power-transmitting protocol and transmit power to the electronic device in accordance with the identified protocol.

Additionally, the control logic 110 is capable of associating a selectable button with a power-transmitting protocol identified by a received identification. In this manner, a user of the wireless charger 100 may place an electronic device to be charged within range of the wireless charger 100 and select a power-transmitting protocol (by selecting a button) that is suited for charging the electronic device.

Figure 2:
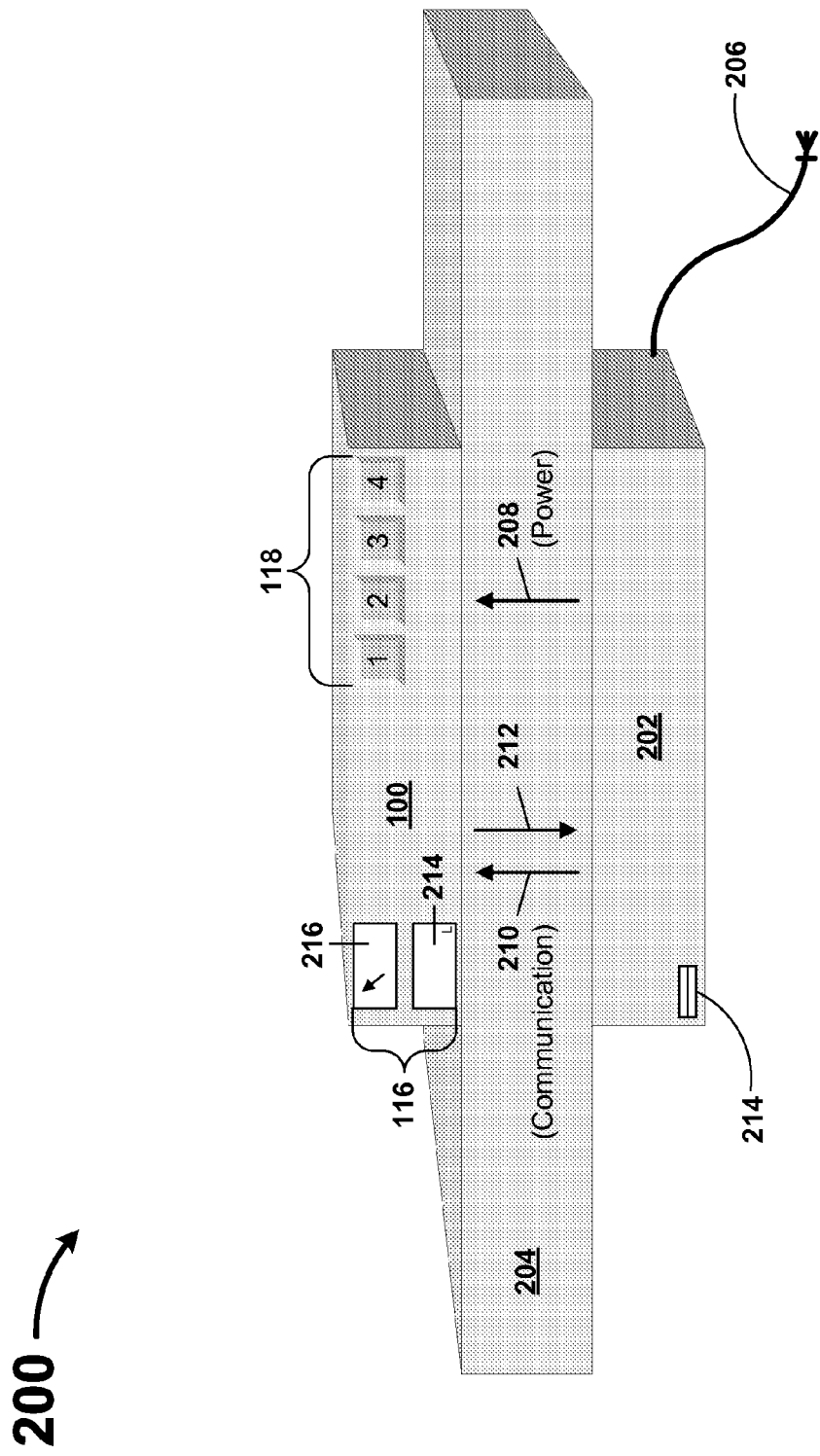
FIG. 2 is an illustration of a charging system in accordance with embodiments of inventive matter disclosed herein.

FIG. 2 illustrates a charging system 200 utilizing the wireless charger 100 of FIG. 1 in conjunction with another wireless charger 202 in accordance with embodiments of inventive matter disclosed herein. FIG. 2 shows a first wireless charger 202 positioned underneath a portion of a desktop 204 and a second wireless charger 100 positioned on top of the desktop 204.

The first wireless charger 202 comprises a power cord 206 through which the first wireless charger 202 can receive electrical power from a standard power source, such as a 120 V outlet commonly found in residential and office buildings or a 12 V source as is commonly used in the auto industry. The first wireless charger 202 is capable of wirelessly transmitting power 208 to the second wireless charger 100 and the second wireless charger 100 is capable of receiving the wirelessly transmitted power 208. The wireless power-receiving device of the second wireless charger 100 can receive the wirelessly transmitted power 208.

In particular embodiments, the first wireless charger 202 is capable of wirelessly transmitting communications 210 and the second wireless charger 100 is capable of receiving the wirelessly transmitted communications 210. In particular embodiments, the second wireless charger 100 is capable of wirelessly transmitting communications 212 and the first wireless charger 202 is capable of receiving the wirelessly transmitted communications 212. The first wireless charger 202 also includes a communications port 214 (e.g., a USB port) that allows the first wireless charge 202 to be communicatively connected, for example, to a computer or directly to a network (e.g., the internet). The first wireless charger 202 can receive power-transmitting protocols via the communications port 214 and wirelessly communicate the protocols to the second wireless charger 100 so that the second wireless charger 100 can associate each received protocol with a selectable button.

A user of the second wireless charger 100 may charge an electronic device by placing the electronic device to be charged within range of the wireless power-transmitting device of the wireless charger 100. The user can accomplish this, for example, by placing the electronic device to be charge on top of the wireless charger 100. The user may select a particular power-transmitting protocol for charging the electronic device by selecting one of the selectable buttons in the settings mechanism 118.

The second wireless charger 100 is portable. Thus, the wireless charger 100 can still be used to charge electronic devices even if it is removed from within range of the first wireless charger 202. For example, a user may wish to take the wireless charger 100 with them to charge an electronic device while they are traveling. The battery indicator 214 will indicate to the user when the wireless charger 100 itself needs to be recharged. When the user returns from traveling, the user can place the wireless charger 100 within range of the first wireless charger 202 so that the second wireless charger 100 can be recharged, if necessary. Since the first wireless charger 202 may be positioned out of sight on the underneath side of a desktop, the user may use the charging indicator 216 to determine when the second wireless charge 100 is within range of the first wireless charger 202.

FIG. 3 illustrates operations 300 performable by a wireless charger in accordance with embodiments of inventive matter disclosed herein. The operations 300 comprise step 310, step 320, and step 330. In particular embodiments, the wireless charger may perform all three steps simultaneously.

In step 310, the wireless charger wirelessly receives power at a first device located in a housing, the first device being a wireless power-receiving device. In step 320, the wireless charger transfers the received power to a second device located in the housing, the second device being a wireless power-transmitting device. In step 330, the wireless charger wirelessly transmits the transferred power from the wireless power-transmitting device.

Particular embodiments of wireless chargers disclosed herein include one or more rechargeable batteries. FIG. 4 illustrates operations 400 performable by such a wireless charger in accordance with embodiments of inventive matter disclosed herein. The operations 400 comprise step 310, step 420, and step 330. Steps 310 and 330 are the same as shown in FIG. 3.

Step 420 comprises step 422 and step 424. In step 422, the wireless charger transfers received power from the wireless power-receiving device to a rechargeable battery located in the housing. In step 424, the wireless charger transfers power from the rechargeable battery to the power-transmitting device.

Particular embodiments of wireless chargers disclosed herein can operate in accordance with one of a plurality of power-transmission protocols. These wireless charges are referred to herein as programmable. FIG. 5 illustrates operations 500 performable by a programmable wireless charger in accordance with embodiments of inventive matter disclosed herein. The operations 500 comprise steps 530 and 540.

Step 530 comprises step 532 and step 534. In step 532, the wireless charger wirelessly receives an identification of a power-transmitting protocol. In step 534, the wireless charger operates a wireless power-transmitting device to wirelessly transmit power in accordance with the received power-transmitting protocol.

Step 540 comprises step 542, step 544, step 546, and step 548. In step 542, the wireless charger receives identifications of power-transmitting protocols at a wireless communications device. In step 544, the wireless charger associates each of a plurality of selectable buttons with an identified power-transmitting protocol. In step 546, the wireless charger detects that one of the plurality of selectable buttons has been selected. In step 548, the wireless charger operates a wireless power-transmitting device in accordance with a power-transmitting protocol associated with the selected button.

In accordance with inventive matter disclosed herein, novel devices and methods related to wireless charging of electronic devices have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereof.

What is claimed is:

1. A portable wireless charger, comprising:
 a portable housing containing;
  a wireless power-receiving device comprising receive circuitry and a receive coil located in the housing;
  a separate wireless power transmitting device comprising transmit circuitry and a transmit coil located in the housing;
  a control logic comprising electronic hardware connecting said receive circuit with said transmit circuitry located in the housing for transmitting said power received by the wireless power-receiving device to the wireless power-transmitting device, said wireless charger thereby being capable of simultaneously receiving power wirelessly and transmitting said power wirelessly from said power-transmitting device outside of the portable wireless charger and wherein the control logic further functions to operate the wireless power-transmitting device to wirelessly transmit power in accordance with a selectable power-transmitting protocol.

2. The wireless charger of claim 1, additionally comprising: a rechargeable battery located in the housing, wherein the control logic is capable of transferring power received by the wireless power-receiving device to the rechargeable battery, and wherein the control logic is capable of transferring power from the rechargeable battery to the wireless power-transmitting device.

3. The wireless charger of claim 1, comprising: a wireless communications device capable of wirelessly receiving an identification of a selectable power-transmitting protocol.

4. The wireless charger of claim 1, comprising:
 a plurality of selectable buttons, each of the plurality of buttons having a power-transmitting protocol associated with it, wherein the control logic is capable of detecting when one of the selectable buttons is selected, and wherein the control logic is capable of operating the wireless power-transmitting device in accordance with the power-transmitting protocol associated with the selected button.

5. The wireless charger of claim 4, comprising:
 a wireless communications device capable of receiving identifications of power transmitting protocols, wherein the control logic is capable of associating each of the plurality of selectable buttons with a power-transmitting protocol corresponding to a received identification.

6. A charging system, comprising:
 a first wireless charger capable of wirelessly transmitting power; and
 a second portable wireless charger, the second wireless charger comprising:
  a portable housing containing;
  a wireless power-receiving device comprising receive circuitry and a receive coil, located in the housing, the wireless power-receiving device capable of wirelessly receiving power transmitted from the first wireless charger;
  a separate wireless power-transmitting device comprising transmit circuitry and a transmit coil located in the housing said receiving and transmitting devices capable of wirelessly simultaneously receiving and transmitting power from said power transmitting device outside of said second portable wireless charger; and
  a control logic comprising electronic hardware connecting said receive circuitry to said transmit circuitry located in the housing, thereby the control logic transmits said power received by the wireless power-receiving device to the wireless power transmitting device and outside the second portable wireless charger; wherein the control logic further functions to operate the wireless power-transmitting device to wirelessly transmit power in accordance with a selectable power-transmitting protocol.

7. The charging system of claim 6, wherein the second wireless charger additionally comprises:
 a rechargeable battery located in the housing, wherein the control logic is capable of transferring power received by the wireless power-receiving device to the rechargeable battery, and wherein the control logic is capable of transferring power from the rechargeable battery to the wireless power-transmitting device.

8. The charging system of claim 6, wherein the first wireless charger includes a first wireless communications device, wherein the second wireless charger includes a second wireless communications device, and wherein the second wireless charger is capable of transmitting, via the second communications device, to stop the first wireless charger from wirelessly transmitting power.

9. The wireless charger of claim 8, wherein the second wireless charger comprises:
 a wireless communications device capable of wirelessly receiving an identification of selectable power-transmitting protocol.

10. The wireless charger of claim 8, wherein the second wireless charger comprises:
 a plurality of selectable buttons, each of the plurality of buttons having a power-transmitting protocol associated with it, wherein the control logic is capable of detecting when one of the selectable buttons is selected, and wherein the control logic is capable of operating the wireless power-transmitting device in accordance with the power-transmitting protocol associated with the selected button.

11. The wireless charger of claim 10, wherein the second wireless charger comprises:
 a wireless communications device capable of receiving identifications of power-transmitting protocols, wherein the control logic is capable of associating each of the plurality of selectable buttons with a power-transmitting protocol corresponding to a received identification.

12. The wireless charger of claim 11, wherein the first wireless charger comprises:

a wireless communications device, wherein the first wireless charger is capable of wirelessly transmitting, via the wireless communications device, identifications of power transmitting protocols.

13. A portable wireless charger, said charger comprising:
a portable housing containing;
   a wireless power-receiving device comprising receive circuitry and a receive coil located in said housing; and
   a separate wireless power-transmitting device comprising transmit circuitry and a transmit coil located in said housing; and
   a control logic comprising electronic hardware connecting said receive circuitry with said transmit circuitry, located in said housing, for simultaneously transmitting said power from said receiving device to said transmitting device for simultaneous transmission from the portable wireless charger to wirelessly charge a secondary battery in an electronic device to be charged.

14. The wireless charger of claim 13, farther comprising selectable power transmitting protocol and rechargeable battery, wherein said selectable power-transmitting protocol is selected by the electronic device to be charged.

15. The wireless charger of claim 13, further comprising selectable power-transmitting protocol and rechargeable battery, wherein said selectable power-transmitting protocol is selected by user of said charger.

16. The wireless charger of claim 13, wherein said power-receiving device is adapted to receive alternating current or direct current.

17. The power-receiving device of claim 13, wherein said device converts received alternating current to direct current and transmits said direct current to transmit circuitry using the control logic comprising electronic hardware connected to said receive circuitry and said transmit circuitry.

18. The power-receiving device of claim 13, wherein said device converts received alternating current to direct current and transmits said direct current to rechargeable battery located in the housing, wherein the control logic transmits power received by said power-receiving device to said battery, and wherein said control logic comprising electronic hardware connected to said receive circuitry and said transmit circuitry, transmits said power from said battery to said power-transmitting device.

* * * * *